US010856212B2

(12) United States Patent
Viger et al.

(10) Patent No.: US 10,856,212 B2
(45) Date of Patent: Dec. 1, 2020

(54) ACCESS MANAGEMENT TO MULTI-USER UPLINK RANDOM RESOURCE UNITS BY A PLURALITY OF BSSS

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/859,007

(22) Filed: Dec. 29, 2017

(65) Prior Publication Data

US 2018/0199271 A1   Jul. 12, 2018

(30) Foreign Application Priority Data

Jan. 10, 2017  (GB) .................................. 1700432.6

(51) Int. Cl.
*H04W 74/08*   (2009.01)
*H04W 48/12*   (2009.01)
*H04W 92/20*   (2009.01)
*H04W 72/12*   (2009.01)
*H04W 74/00*   (2009.01)
*H04W 84/12*   (2009.01)
*H04W 88/08*   (2009.01)

(52) U.S. Cl.
CPC ......... *H04W 48/12* (2013.01); *H04W 72/121* (2013.01); *H04W 74/006* (2013.01); *H04W 74/085* (2013.01); *H04W 92/20* (2013.01); *H04W 72/1289* (2013.01); *H04W 84/12* (2013.01); *H04W 88/08* (2013.01)

(58) Field of Classification Search
CPC ................................................. H04W 74/0833
See application file for complete search history.

(56) References Cited

U.S. PATENT DOCUMENTS

2011/0013608 A1\*  1/2011  Lee ....................... H04W 72/04
                                                                                 370/338
2014/0078969 A1   3/2014  Guo et al.
2015/0139209 A1\*  5/2015  Park ....................... H04W 76/00
                                                                                 370/338

(Continued)

FOREIGN PATENT DOCUMENTS

WO    2015/090419 A1   6/2015

*Primary Examiner* — Ayanah S George
(74) *Attorney, Agent, or Firm* — Canon U.S.A., Inc. IP Division

(57) ABSTRACT

A physical Access Point (AP) manages a plurality of BSS groups through Virtual APs. The AP periodically sends beacon frames informing of the profile of each BSS of the plurality of BSSs. To improve channel utilization, the trigger frame identifies a plurality of BSS groups, stations of which are allowed to access the resources units to transmit data during the reserved TXOP. The AP receives, during the reserved TXOP, data from one station of a first group identified in the trigger frame and data from one station (separate from the first one) of a second and separate group identified in the trigger frame. First group and second group use the same joint set of random access parameters for the random access procedure, thus ensuring equivalent fairness in accessing the offered the resources units to transmit data during the reserved TXOP to several BSSs.

22 Claims, 9 Drawing Sheets

(56) References Cited

U.S. PATENT DOCUMENTS

2016/0088658 A1    3/2016  Padden
2016/0227565 A1*   8/2016  Ghosh ................. H04W 74/006
2017/0303245 A1*  10/2017  Asterjadhi .......... H04L 43/0894

* cited by examiner

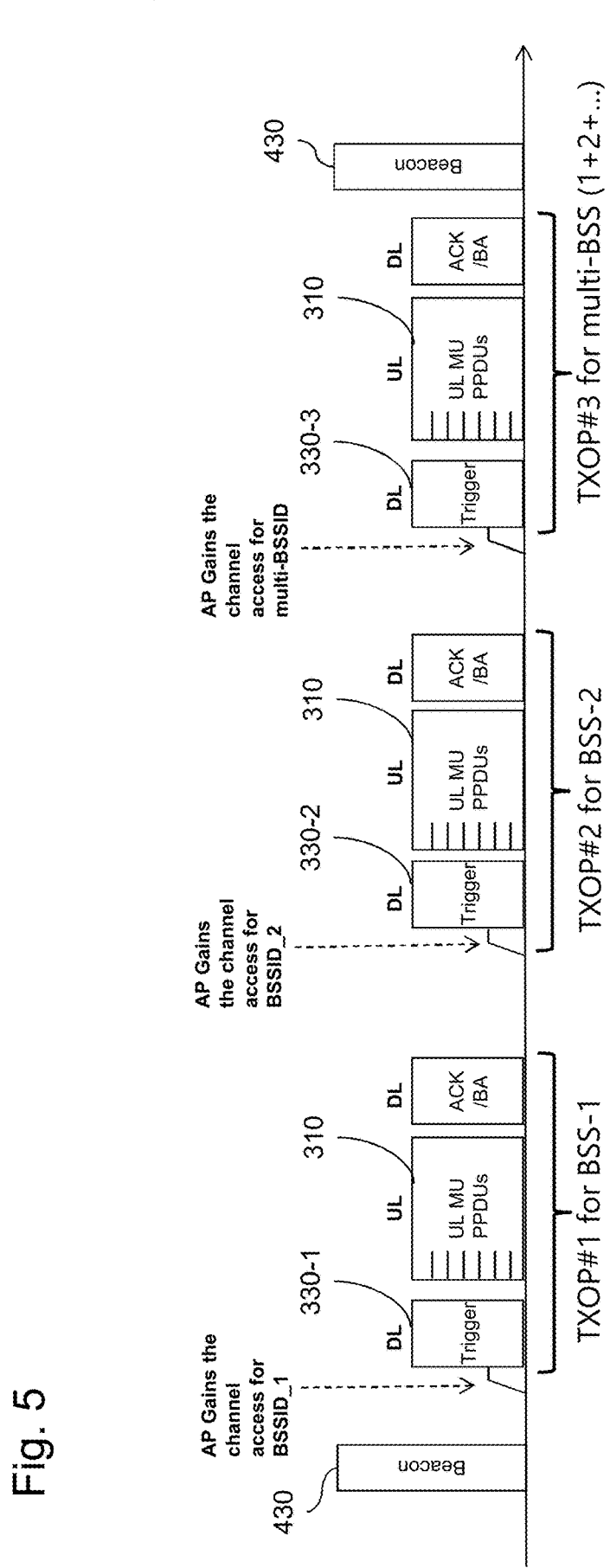

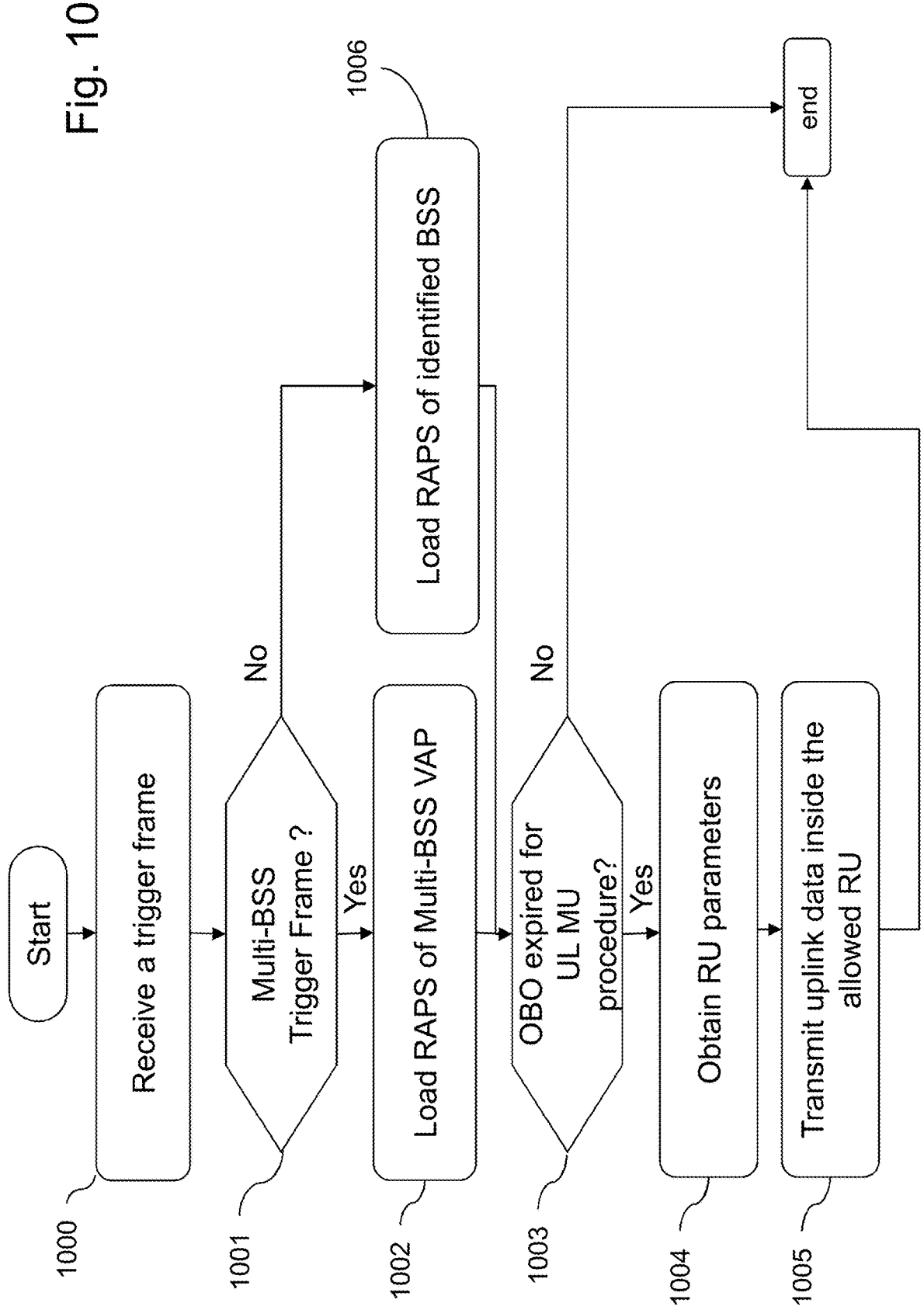

ACCESS MANAGEMENT TO MULTI-USER UPLINK RANDOM RESOURCE UNITS BY A PLURALITY OF BSSS

CROSS REFERENCE TO RELATED APPLICATION

This application claims the benefit under 35 U.S.C. § 119(a)-(d) of United Kingdom Patent Application No. 1700432.6, filed on Jan. 10, 2017 and entitled "Improved access management to multi-user uplink random resource units by a plurality of BSSs". The above cited patent application is incorporated herein by reference in its entirety.

FIELD OF THE INVENTION

The present invention relates generally to communication networks and more specifically to the sending of data over a communication channel which is split into sub-channels (or Resource Units) that are available to groups of stations associated with a respective plurality of network cells.

The invention finds application in wireless communication networks, in particular to the access of an 802.11ax composite channel and of OFDMA Resource Units forming for instance an 802.11ax composite channel for Uplink communication. One application of the method regards wireless data communication over a wireless communication network using Carrier Sense Multiple Access with Collision Avoidance (CSMA/CA), the network being accessible by a plurality of station devices.

BACKGROUND OF THE INVENTION

The IEEE 802.11 MAC family of standards (a/b/g/n/ac/ etc.) define a way wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

In this context, multi-user (MU) transmission has been considered to allow multiple simultaneous transmissions to/from different users in both downlink (DL) and uplink (UL) directions from/to the AP and during a transmission opportunity granted to the AP. In the uplink, multi-user transmissions can be used to mitigate the collision probability by allowing multiple non-AP stations to simultaneously transmit. To actually perform such multi-user transmission, it has been proposed to split a granted communication channel into sub-channels, also referred to as resource units (RUs), that are shared in the frequency domain by multiple users (non-AP stations/nodes), based for instance on Orthogonal Frequency Division Multiple Access (OFDMA) technique.

The above is introduced with respect to a single group of stations that is managed by the access point with which each station has previously registered. In the 802.11 standard, such a group of stations together with the access point is known as a Basic Service Set (BSS). The access point acts as a master to control the stations within the BSS. The simplest BSS consists of one access point and one station.

Each BSS is uniquely identified by a specific basic service set identification, BSSID. For a BSS operating in infrastructure mode, the specific BSSID is usually a 48-bit MAC address of the access point. The specific BSSID is the formal name of the BSS and is always associated with only one BSS.

Together with the specific BSSID, each BSS has its own service set identification, SSID, which is the informal (human) name of the BSS (since this own SSID identifier is often entered into devices manually by a human user).

In a BSS, the stations usually contend for access to the communication medium as described above.

Recent developments provide that a single physical AP can operate as the master stations of a plurality of BSSs, i.e. of a plurality of independent groups of stations. This avoids using one physical AP per BSS or WLAN. It also makes it possible to use the same primary channel for all BSSs, thereby avoiding channel interference problems.

Such operating scheme where a plurality of BSSs is managed by the same physical AP is performed through so-called virtual access points (virtual APs or VAPs).

A Virtual AP is a logical entity that resides within a physical Access Point (AP). To a client, the VAP appears as an independent access point with its own unique SSID. To implement virtual APs, multiple BSSIDs are used with associated SSIDs. The BSSIDs for the VAPs in the physical AP are usually generated from a base BSSID specific to the underlying physical AP, usually the base MAC address of the AP.

The terms Virtual AP, specific BSSID, BSS and SSID can be used synonymously throughout this document, to designate a group or cell of stations managed by a physical AP. Depending on the context, specific BSSID and own SSID may further refer to the identifier of a BSS/WLAN, either through a MAC address (specific BSSID) or an informal (human) name (own SSID).

Providing a plurality of SSIDs (or BSS) corresponds to providing various different networks in a particular area. It can give access to different resources and present services which may have differing management or security policies applied. This advantageously allows various categories of user, e.g. staff, students or visitors etc. to be provided with network services which are appropriate to them.

In conventional 802.11 approaches, only one SSID (or BSS) is advertised per signaling message such as a beacon frame. As a consequence, multiple beacons are used to advertise the SSIDs corresponding to the virtual APs configured at the physical AP. This solution is compatible with most 802.11 stations and also allows the SSIDs to support different capability sets.

However, as the number of BSSs increases, more channel utilization results from such signaling. This downside is further increased because the signaling messages are transmitted at low bit rate, usually at the lowest supported data rate so that all clients can receive it.

To improve this situation of increased channel utilization in case of multiple BSSs, the IEEE 802.11v Wireless Network Management specification defines a mechanism to advertise multiple security profiles including BSSID/SSID advertisements, with a single beacon frame.

However, the resulting network management is not satisfactory. In particular, the medium access for uplink communication through trigger frames using contention access is performed independently for each BSS and the support for multi-BSS Trigger frames is not provided.

SUMMARY OF INVENTION

It is a broad objective of the present invention to improve this situation, i.e. to overcome some or all of the foregoing limitations. In particular, the present invention seeks to provide a more efficient usage of the UL MU random access procedure in case of multiple BSS group.

In this context, the present invention proposes, according to a first aspect, a wireless communication method in a wireless network comprising a physical access point and a plurality of stations organized into groups, each group being managed by a virtual access point implemented in the physical access point. The method comprising the following steps, at the physical access point:

sending a trigger frame reserving a transmission opportunity on at least one communication channel of the wireless network, the transmission opportunity including random resource units that the stations may access using a contention scheme, the trigger frame identifying a plurality of groups, stations of which are allowed to contend for access to the random resources units included in the transmission opportunity to transmit data;

sending a joint set of random access parameters to be used in common by stations of the plurality of groups identified in the trigger frame to contend for access to a random resource unit included in the transmission opportunity; and in response to the trigger frame, receiving, over the random resource unit, data from a station of one of the plurality of identified groups identified in the trigger frame.

Correspondingly, the invention also regards a physical access point in a wireless network comprising a plurality of stations organized into groups, each group being managed by a virtual access point implemented in the physical access point. The physical access point comprising:

at least one microprocessor configured for carrying out the following steps:

sending a trigger frame reserving a transmission opportunity on at least one communication channel of the wireless network, the transmission opportunity including random resource units that the stations may access using a contention scheme, the trigger frame identifying a plurality of groups, stations of which are allowed to contend for access to the random resources units included in the transmission opportunity to transmit data;

sending a joint set of random access parameters to be used in common by stations of the plurality of groups identified in the trigger frame to contend for access to a random resource unit included in the transmission opportunity; and in response to the trigger frame, receiving, over the random resource unit, data from a station of one of the plurality of identified groups identified in the trigger frame.

In one implementation, the joint set of random access parameters is included in the trigger frame. This advantageously provides highly interactive adaptation of the parameter set upon each trigger frame.

In one implementation, the joint set of random access parameters is included in a beacon frame, separate from the trigger frame, sent by the physical access point. Advantageously, the groups are advertised in advance from the further usage, and the stations have time to memorize various group contexts. It saves also overhead than when trigger frames are used, which are more frequent than beacon frames.

In one implementation, a plurality of sets of random access parameters are sent by the physical access point in one or more beacon frames, each set being associated with one group for use by the stations of that group to contend for access to random resources units of a transmission opportunity reserved by a trigger frame for the stations of the group. This allow an AP to set and finely tune individual parameters for each group (according encountered contention, number of stations, etc.).

In one implementation, each set of random access parameters is sent in a separate beacon frame by the virtual access point, implemented in the physical access point, which manages the group of stations associated with the set. This allows to maintain backward compatibility of legacy stations.

In one implementation, a plurality of sets of random access parameters are sent by the physical access point in one beacon frame. This reduces overhead in wireless medium (one transmission instead of a lot of beacons).

In one implementation, the joint set of random access parameters is additional to the plurality of sets and is included in one of the beacon frames. Consequently, the joint set is clearly advertised to the stations, according a legacy method (either individual beacons or a mutli-BSS beacon).

In one implementation, the joint set of random access parameters is one of the plurality of sets of random access parameters. This reduces the overhead in beacon body.

In one implementation, at least one beacon frame includes an indication indicating which one of the plurality of sets is to be used as the joint set of random access parameters.

In one implementation, the trigger frame includes an indication indicating which one of the plurality of sets is to be used as the joint set of random access parameters.

In one implementation, the joint set of random access parameters is the set of random access parameters of the virtual access point identified as the transmitter of the beacon frame. This makes the transmitted BSS the reference for random access parameters.

In one implementation, each group is uniquely identified by a specific basic service set identification, BSSID.

In one implementation, the sent trigger frame includes a list of BSSIDs identifying the plurality of groups, stations of which are allowed to contend for access to the random resources units of the transmission opportunity reserved by the trigger frame.

In one implementation, each BSSID is derived from a base BSSID specific to the physical access point.

In one implementation, the BSSID field is n-bit long, where n is the number of bits varying between the BSSIDs compared to the base BSSID.

In one implementation, a set of random access parameters includes a lower boundary OCWmin and/or higher boundary OCWmax, both defining a selection range from which a size of a contention window OCW for random access is selected.

The present invention proposes, according to a second aspect, a wireless communication method in a wireless network comprising a physical access point and a plurality of stations organized into groups, each group being managed by a virtual access point implemented in the physical access point. The method comprising the following steps, at one station belonging to a first group:

receiving a trigger frame from the physical access point, the trigger frame reserving a transmission opportunity on at least one communication channel of the wireless network, the transmission opportunity including random resource units that the stations may access using a contention scheme, the trigger frame identifying the first group and a second group, stations of which are allowed to contend for access to the random resources units included in the transmission opportunity to transmit data;

obtaining a joint set of random access parameters to be used in common by stations of the first and second groups to contend for access to a random resource unit included in the transmission opportunity; and contending for access to the random resource unit using the obtained joint set of random access parameters.

Correspondingly, the invention also regards a station device in a wireless network comprising a physical access point and a plurality of stations organized into groups, each group being managed by a virtual access point implemented in the physical access point, the station, belonging to a first group, comprising:

at least one microprocessor configured for carrying out the following steps:

receiving a trigger frame from the physical access point, the trigger frame reserving a transmission opportunity on at least one communication channel of the wireless network, the transmission opportunity including random resource units that the stations may access using a contention scheme, the trigger frame identifying the first group and a second group, stations of which are allowed to contend for access to the random resources units included in the transmission opportunity to transmit data;

obtaining a joint set of random access parameters to be used in common by stations of the first and second groups to contend for access to a random resource unit included in the transmission opportunity; and contending for access to the random resource unit using the obtained joint set of random access parameters.

In one implementation, a set of random access parameters includes a lower boundary OCWmin and/or higher boundary OCWmax, both defining a selection range from which a size of a contention window OCW for random access is selected.

In one implementation, the contention scheme at the station decrements a backoff value OBO of a backoff counter initially drawn in the range of the contention window for random access [0, OCW], and triggers access to a random resource unit in the transmission opportunity upon the backoff value reaching a target value.

In one implementation, the joint set of random access parameters is obtained from the received trigger frame.

In one implementation, the joint set of random access parameters is obtained from a beacon frame, separate from the trigger frame, received from the physical access point.

In one implementation, a plurality of sets of random access parameters are received from the physical access point in one or more beacon frames, each set being associated with one group for use by the stations of that group to contend for access to random resources units of a transmission opportunity reserved by a trigger frame for the stations of the group.

In one implementation, each set of random access parameters is sent by the physical access point in a separate beacon frame of the virtual access point managing the group of stations associated with the set.

In one implementation, the joint set of random access parameters is additional to the plurality of sets and is included in one of the beacon frames.

In one implementation, the joint set of random access parameters is included in the beacon frame received from the virtual access point managing the first group.

In one implementation, the joint set of random access parameters is one of the plurality of sets of random access parameters.

In one implementation, at least one beacon frame includes an indication indicating which one of the plurality of sets is to be used as the joint set of random access parameters.

In one implementation, the trigger frame includes an indication indicating which one of the plurality of sets is to be used as the joint set of random access parameters.

In one implementation, each group is uniquely identified by a specific basic service set identification, BSSID.

In one implementation, the joint set of random access parameters is selected among the plurality of sets based on the BSSID of the associated group.

In one implementation, the set associated with the group having the lowest BSSID is selected as the joint set of random access parameters.

In one implementation, each BSSID is derived from a base BSSID specific to the physical access point.

In one implementation, the set associated with the group identified by the base BSSID is selected as the joint set of random access parameters.

In one implementation, the joint set of random access parameters is selected among the plurality of sets based on a predefined rule known to stations of the first and the second group.

In one implementation, the set associated with the group of the virtual access point that sent the trigger frame is selected as the joint set of random access parameters.

In one implementation, the method further comprises:

upon receiving of another trigger frame reserving another transmission opportunity, the other transmission opportunity including random resource units that the stations may access using a contention scheme, the other trigger frame identifying only the first group, stations of which are allowed to contend for access to the random resources units included in the other transmission opportunity to transmit data;

storing at least one of the obtained set of random parameters, a current value of a backoff counter and a current value of the contention window OCW;

obtaining another set of random access parameters to be used by the station to contend for access to a random resource unit included in the other transmission opportunity; and contending for access to the random resource unit using the other obtained set of random access parameters.

The present invention proposes, according to a third aspect, a wireless communication method in a wireless network comprising a physical access point and a plurality of stations organized into groups, each group being managed by a virtual access point implemented in the physical access point, the method comprising the following steps, at one station belonging to a first group:

receiving a first trigger frame from the physical access point, the first trigger frame reserving a first transmission opportunity on at least one communication channel of the wireless network, the first transmission opportunity including random resource units that the stations may access using a contention scheme, the first trigger frame identifying only the first group, stations of which are allowed to contend for access to the random resources units included in the first transmission opportunity to transmit data;

obtaining a first set of random access parameters to be used by the station to contend for access to a random resource unit included in the first transmission opportunity;

contending for access to the random resource unit using the obtained first set of random access parameters; and upon receiving of a second trigger frame reserving a second transmission opportunity, the second transmission opportunity including random resource units that the stations may access using a contention scheme, the second trigger frame identifying the first group and a second group, stations of which are allowed to contend for access to the random resources units included in the second transmission opportunity to transmit data:

storing at least one of the first set of random parameters, a current value of a backoff counter and a current value of a contention window;

obtaining a second set of random access parameters to be used by the station to contend for access to a random resource unit included in the second transmission opportunity; and contending for access to the random resource unit using the obtained second set of random access parameters.

Correspondingly, the invention also regards a station device in a wireless network comprising a physical access point and a plurality of stations organized into groups, each group being managed by a virtual access point implemented in the physical access point, the station, belonging to a first group, comprising:

at least one microprocessor configured for carrying out the following steps:

receiving a first trigger frame from the physical access point, the first trigger frame reserving a first transmission opportunity on at least one communication channel of the wireless network, the first transmission opportunity including random resource units that the stations may access using a contention scheme, the first trigger frame identifying only the first group, stations of which are allowed to contend for access to the random resources units included in the first transmission opportunity to transmit data;

obtaining a first set of random access parameters to be used by the station to contend for access to a random resource unit included in the first transmission opportunity;

contending for access to the random resource unit using the obtained first set of random access parameters; and upon receiving of a second trigger frame reserving a second transmission opportunity, the second transmission opportunity including random resource units that the stations may access using a contention scheme, the second trigger frame identifying the first group and a second group, stations of which are allowed to contend for access to the random resources units included in the second transmission opportunity to transmit data:

storing at least one of the first set of random parameters, a current value of a backoff counter and a current value of a contention window;

obtaining a second set of random access parameters to be used by the station to contend for access to a random resource unit included in the second transmission opportunity; and contending for access to the random resource unit using the obtained second set of random access parameters.

In one implementation, the method further comprises:

upon receiving of a third trigger frame reserving a third transmission opportunity, the third transmission opportunity including random resource units that the stations may access using a contention scheme, the third trigger frame identifying only the first group, stations of which are allowed to contend for access to the random resources units included in the third transmission opportunity to transmit data;

restoring at least one of the first set of random parameters, a current value of a backoff counter and a current value of the contention window; and contending for access to the random resource unit using the restored parameters and/or values.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 5 illustrates some exemplary situations of the aforementioned issues of trigger frames belonging to distinct BSS contexts.

FIG. 10 illustrates, using a flowchart, general steps of a non-AP station receiving a Trigger Frame with multiple BSS support, according to embodiments of the invention.

DETAILED DESCRIPTION

The invention will now be described by means of specific non-limiting exemplary embodiments and by reference to the figures.

Figure 1:
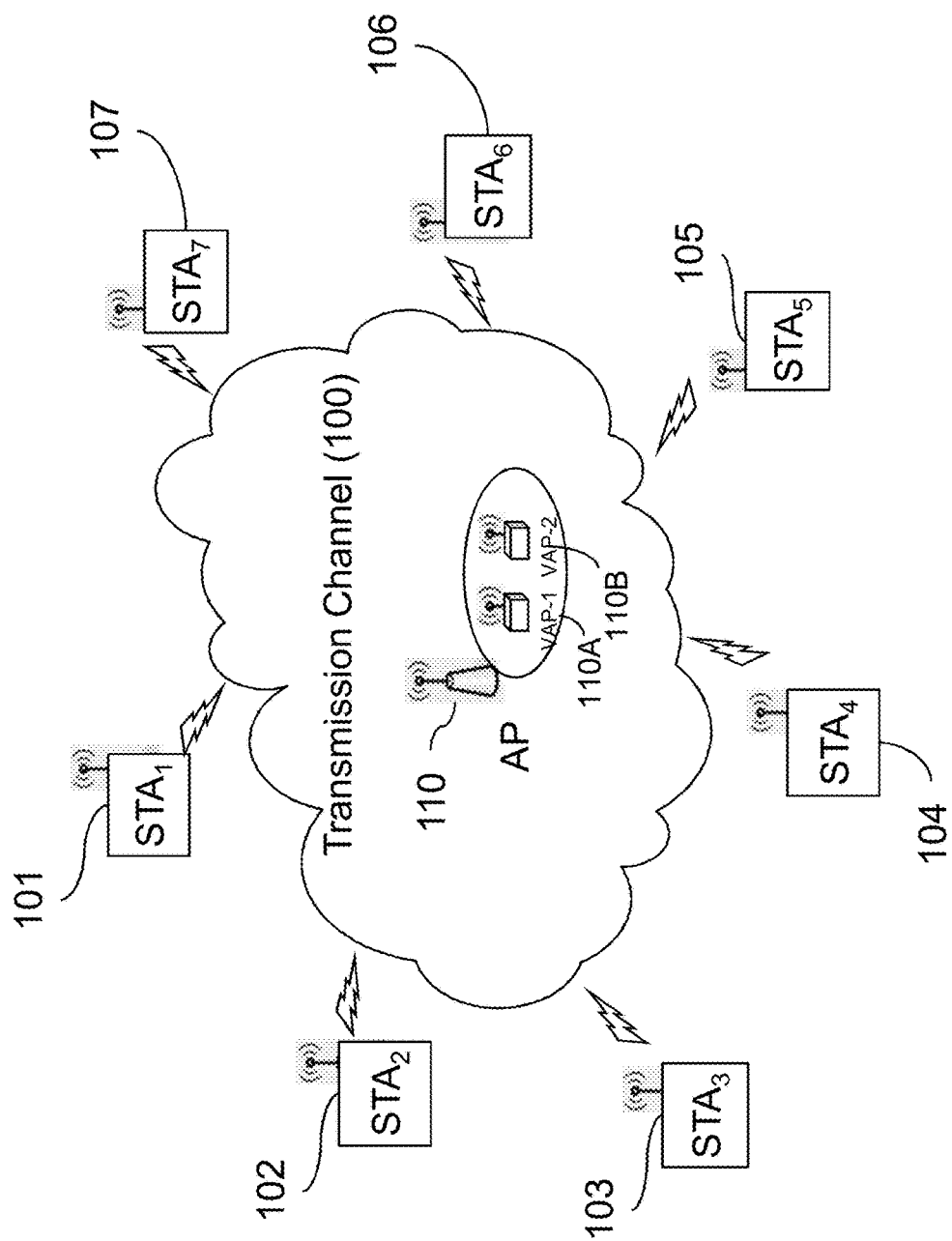
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting station, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

To access the medium, the station starts a countdown backoff counter designed to expire after a number of timeslots, chosen randomly in the contention window range [0, CW], CW (integer) being also referred to as the Contention Window size and defining the upper boundary of the backoff selection interval (contention window range). This backoff mechanism or procedure is the basis of the collision avoidance mechanism that defers the transmission time for a random interval, thus reducing the probability of collisions on the shared channel. After the backoff time period, the source station may send data or control frames if the medium is idle.

One problem of wireless data communications is that it is not possible for the source station to listen while sending, thus preventing the source station from detecting data corruption due to channel fading or interference or collision phenomena. A source station remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving station if the frames are received with success, to notify the source station that no corruption of the sent data frames occurred.

The ACK is transmitted at the end of reception of the data frame, immediately after a period of time called Short InterFrame Space (SIFS).

If the source station does not receive the ACK within a specified ACK timeout or detects the transmission of a different frame on the channel, it may infer data frame loss. In that case, it generally reschedules the frame transmission according to the above-mentioned backoff procedure.

The wireless communication system of FIG. 1 comprises a physical access point 110 configured to manage two or more WLANs (or BSSs), i.e. two or more groups of stations. Each BSS is uniquely identified by a specific basic service set identification, BSSID and managed by a virtual AP implemented in the physical AP.

In the example shown, the physical AP implements two virtual APs, virtual AP 1 VAP-1 (110A) having MAC address MAC1 as specific BSSID to manage a first WLAN (BSS), and virtual AP 2 VAP-2 (110B) having MAC address MAC2 as specific BSSID to manage a second WLAN (BSS). Of course more WLANs can be implemented, requiring a corresponding number of virtual APs to be implemented in the physical AP.

All MAC addresses for the virtual APs are generated based on (or "derive from") a base MAC address specific to the physical access point, usually the base 48-bit MAC address of AP 110. For instance $MAC_i$ ('i' being a BSS index) used as specific BSSID(i) for virtual $AP_i$ is generated as follows, from the base MAC address BASE_BSSID:

$MAC_i$=BSSID(i)=(BASE_BSSID modified to set the n LSBs to zero)|((n LSBs of BASE_BSSID)+i) mod $2^n$)

where LSB refers to the least significant bits, "n" is an AP parameter (integer) defining the maximum number (about $2^n$) of possible specific BSSIDs, and 'I' operator is an XOR operator. The specific BSSID(i) thus differ one from the other by their n LSBs. The 48−n MSBs of the generated specific BSSIDs are all similar to the corresponding bits of BASE_BSSID.

As an example, virtual AP 1 provides a WLAN with "guest" as SSID that one or more stations can join, while virtual AP 2 provides a WLAN with "Employee" as SSID that other stations can join simultaneously. The security for each WLAN is different, i.e. WEP and WPA. A same device can usually join two WLANs simultaneously if it has two separate WLAN interfaces (e.g. wifi network card). In that case, the device is considered as two stations in the network, each station being able to join only one WLAN at a time.

Some control frames sent by the AP are an important part of 802.11, for instance beacon frames and probe response frames. The stations are waiting for these frames to know about the WLANs or BSSs available.

These frames let the stations know that an AP and one or more WLANs are available, but also notify the stations about important information such as the corresponding SSID or SSIDs, the corresponding specific BSSID or BSSIDs, the communication mode (Infrastructure or Ad-Hoc), the protection security schemes used (e.g. Open, WEP, WPA-PSK or 802.1X), the support transmission rates used, the channel in operation and optional Information Elements.

When multiple BSSs are provided, multiple beacons are transmitted by the AP, one for each active BSS, usually each 100 ms. It results in that the stations have to process beacon frames more frequently and that channel occupation due to control frames is increased (being noted that the control frames such as the beacon frames are transmitted at low rate).

These drawbacks can be reduced by for example increasing the beacon interval (more than 100 ms) so that the beacon frame of each BSS is sent less frequently. However, this may cause some stations not to detect the beacon frame of a given BSS when scanning, and thus to decide a particular BSS (through its SSID) is not available.

To improve this situation, the IEEE 802.11v Wireless Network Management specification provides a mechanism to advertise multiple security profiles including BSSID advertisements. Thus, a single Beacon frame is sent rather than multiple Beacon frames in order to advertise a plurality of specific BSSIDs/SSIDs. In this mechanism, a new Information Element (IE) is defined (Multiple BSSID IE) in the beacon frames sent by one or the other of the multiple virtual APs (i.e. specific BSSIDs).

The transmitter address of such a beacon frame includes the specific BSSID of the transmitting virtual AP. Furthermore, the Multiple BSSID IE indicates that multiple BSSs is contemplated and provides an indication of the maximum number of BSSs, parameter "n", to the stations, as well as the common, inherited information element values of all of the BSSs (e.g. so that all members of the set use a common operating class, channel, channel access functions, etc.) and the unique information elements of each of the other BSSs indexed by their BSSID indexes 'i' (i.e. different advertised capabilities of the various BSSs, including ones from the BSS of the transmitting VAP).

As mentioned above, a BSSID index 'i' is a value between 1 and $2^n-1$, which identifies the BSSID. It may also be noted that the AP may include two or more Multiple BSSID elements containing elements for a given BSSID index in one Beacon frame.

Such a multi BSS beacon frame may also transmit the base address BASE_BSSID to the stations.

Figure 2:
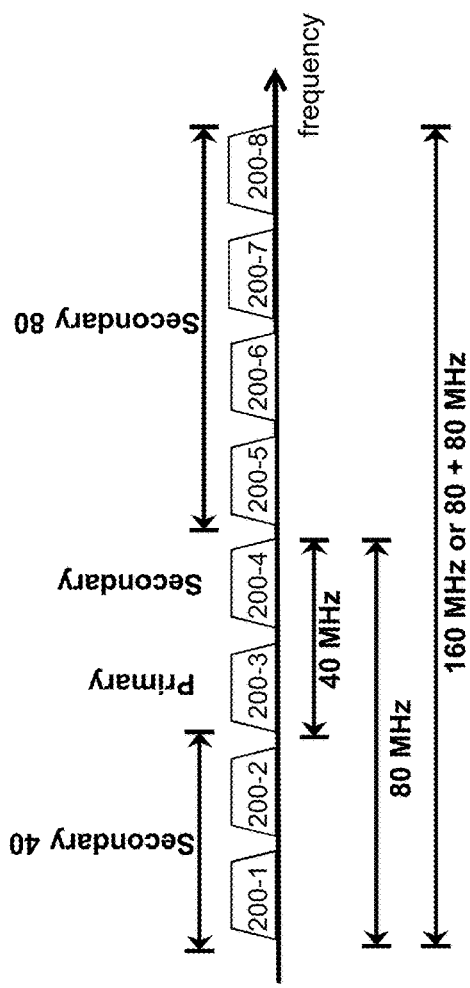
FIG. 2 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 2 illustrates 802.11ac channel allocation that support composite channel bandwidth of 20 MHz, 40 MHz, 80 MHz or 160 MHz.

IEEE 802.11ac introduces support of a restricted number of predefined subsets of 20 MHz channels to form the sole predefined composite channel configurations that are available for reservation by any 802.11ac station on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 200-1 to 200-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively. However the present invention may have embodiments with either composition of the channel bandwidth, i.e. including only contiguous channels or formed of non-contiguous channels within the operating band.

A station (including the AP) is granted a TxOP through the enhanced distributed channel access (EDCA) mechanism on the "primary channel" (200-3). Indeed, for each composite channel having a bandwidth, 802.11ac designates one channel as "primary" meaning that it is used for contending for access to the composite channel. The primary 20 MHz channel is common to all stations (STAs) belonging to the same basic set, i.e. managed by or registered to the same local Access Point (AP).

However, to make sure that no other legacy station (i.e. not belonging to the same set) uses the secondary channels, it is provided that the control frames (e.g. RTS frame/CTS frame or trigger frame described below) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to different users in both downlink (DL) and uplink (UL) directions, once a transmission opportunity has been reserved. In the uplink, multi-user transmissions can be used to mitigate the collision probability by allowing multiple non-AP stations to simultaneously transmit to the AP.

To actually perform such multi-user transmission, it has been proposed to split a granted 20 MHz channel (200-1 to 200-4) into at least one sub-channel, but preferably a plurality sub-channels 310 (elementary sub-channels), also referred to as sub-carriers or resource units (RUs) or "traffic channels", that are shared in the frequency domain by multiple users, based for instance on Orthogonal Frequency Division Multiple Access (OFDMA) technique.

This is illustrated with reference to FIG. 3.

The multi-user feature of OFDMA allows the AP to assign different RUs to different stations in order to increase competition within a reserved transmission opportunity TXOP. This may help to reduce contention and collisions inside 802.11 networks.

In this example, each 20 MHz channel (200-1, 200-2, 200-3 or 200-4) is sub-divided in frequency domain into four OFDMA sub-channels or RUs 310 of size 5 MHz. Of course the number of RUs splitting a 20 MHz channel may be different from four. For instance, between two to nine RUs may be provided (thus each having a size between 10 MHz and about 2 MHz). It is also possible to have a RU width greater than 20 MHz, when included inside a wider composite channel (e.g. 80 MHz).

Contrary to downlink OFDMA wherein the AP can directly send multiple data to multiple stations (supported by specific indications inside the PLOP header), a trigger mechanism has been adopted for the AP to trigger MU uplink communications from various non-AP stations.

To support a MU uplink transmission (during a TXOP pre-empted by the AP), the 802.11ax AP has to provide signalling information for both legacy stations (i.e. non-802.11ax stations) to set their NAV and for 802.11ax client stations to determine the Resource Units allocation.

In the following description, the term legacy refers to non-802.11ax stations, meaning 802.11 stations of previous technologies that do not support OFDMA communications.

Figure 3:
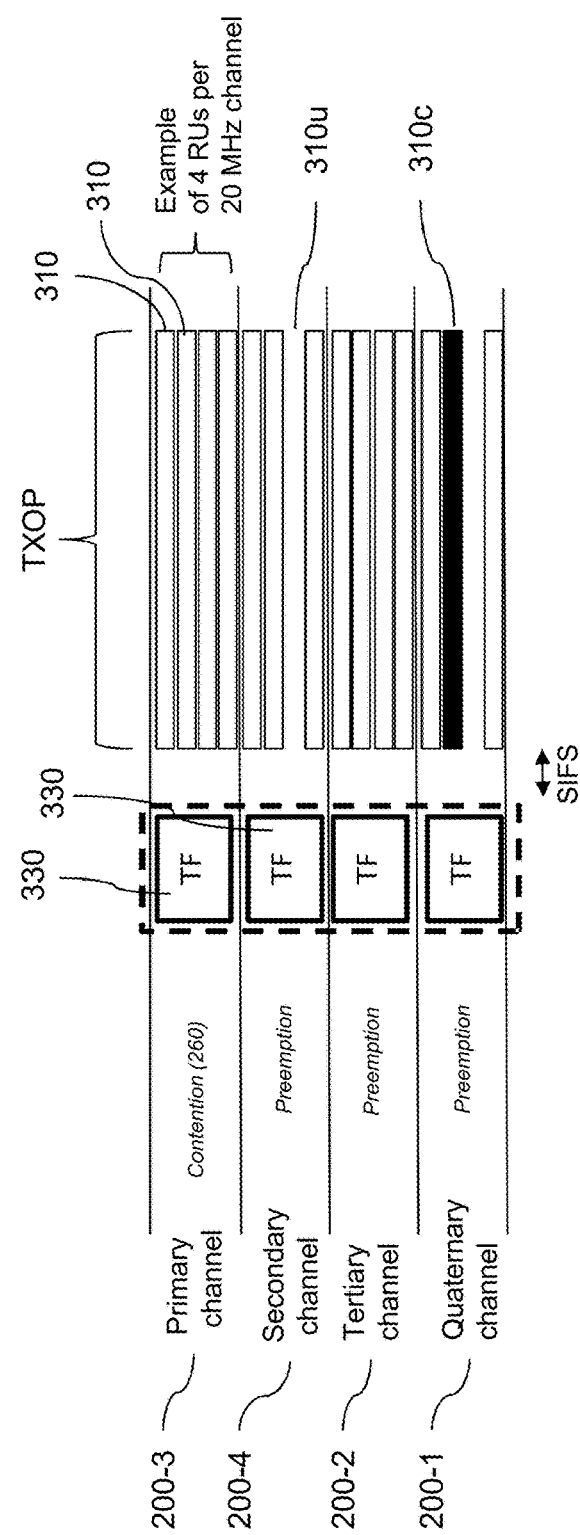
FIG. 3 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 3, the AP sends a trigger frame (TF) 330 to the targeted 802.11ax stations to reserve a transmission opportunity. The bandwidth or width of the targeted composite channel for the transmission opportunity is signalled in the TF frame, meaning that the 20, 40, 80 or 160 MHz value is signalled. The TF frame is a control frame, according the 802.11 legacy non-HT format, and is sent over the primary 20 MHz channel and duplicated (replicated) on each other 20 MHz channels forming the targeted composite channel. Due to the duplication of the control frames, it is expected that every nearby legacy station (non-HT or 802.11ac stations) receiving the TF on its primary channel, then sets its NAV to the value specified in the TF frame. This prevents these legacy stations from accessing the channels of the targeted composite channel during the TXOP.

Based on an AP's decision, the trigger frame TF may define a plurality of resource units (RUs) 310. The multi-user feature of OFDMA allows the AP to assign different RUs to different client stations in order to increase competition. This may help to reduce contention and collisions inside 802.11 networks.

The trigger frame 330 may designate "Scheduled" RUs, which may be reserved by the AP for certain stations in which case no contention for accessing such RUs is needed for these stations. Such RUs and their corresponding scheduled stations are indicated in the trigger frame. For instance, a station identifier, such as the Association ID (AID) assigned to each station upon registration, is added in association with each Scheduled RU in order to explicitly indicate the station that is allowed to use each Scheduled RU. Such transmission mode is concurrent to the conventional EDCA mechanism.

The trigger frame TF may also designate "Random" RUs, in addition or in replacement of the "Scheduled" RUs. The Random RUs can be randomly accessed by the stations of the BSS. In other words, Random RUs designated or allocated by the AP in the TF may serve as basis for contention between stations willing to access the communication medium for sending data. A collision occurs when two or more stations attempt to transmit at the same time over the same RU. An AID equal to 0 may be used to identify random RUs.

Figure 8:
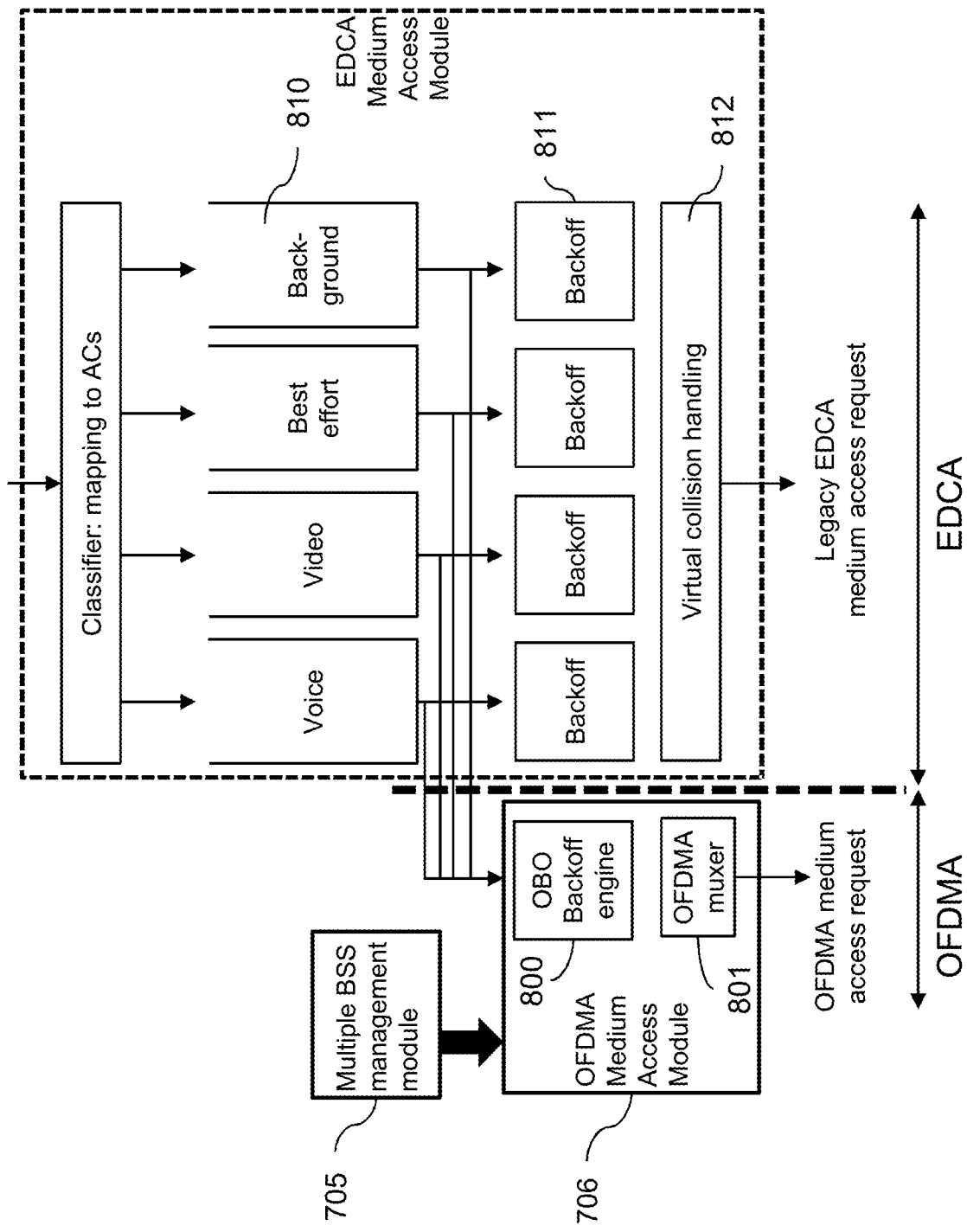
FIG. 8 illustrates an exemplary transmission block of a communication non-AP station according to embodiments of the invention.

A random allocation procedure may be considered for 802.11ax standard based on an additional backoff counter (OFDMA backoff counter, or OBO counter or RU counter, as further illustrated as 800 in FIG. 8) for RU contention by the 802.11ax non-AP stations, i.e. to allow them for performing contention between them to access and send data over a Random RU. The RU backoff counter is distinct from the EDCA backoff counters (as illustrated as 811 in FIG. 8). However data transmitted in an accessed OFDMA RUs 310 is assumed to be served from same EDCA traffic queues (as illustrated as 810 in FIG. 8).

The RU random allocation procedure comprises, for a station of a plurality of 802.11ax stations having an positive RU backoff value (initially drawn inside an RU contention window range), a first step of determining, from a received trigger frame, the sub-channels or RUs of the communication medium available for contention (the so-called "random RUs"), a second step of verifying if the value of the RU backoff value local to the considered station is not greater than the number of detected-as-available random RUs, and then, in case of successful verification, a third step of randomly selecting a RU among the detected-as-available RUs to then send data. In case the second step is not verified, a fourth step (instead of the third) is performed in order to decrement the RU backoff counter by the number of detected-as-available random RUs.

The metrics or parameters of the OFDMA-based RU random access mechanism (such as the RU contention window range, used to draw the RU backoff) are signaled by an AP through beacon frames in a new Information Element, called the RAPS element (RAPS stands for OFDMA-based Random Access Parameter Set). The format of the RAPS element is further defined in FIG. 4c. A non-AP station uses the RAPS element provided by the AP to which the station is associated. The RAPS is introduced with respect to a single BSS group of stations that is managed by one access point with which each station has previously registered.

As one can note, a station is not guaranteed to perform OFDMA transmission over a random RU for each TF received. This is because at least the RU backoff counter is decremented upon each reception of a Trigger Frame by the number of proposed Random RUs, thereby differing data transmission to a subsequent trigger frame (depending of the current value of the RU backoff number and of the number of random RUs offered by each of further received TFs).

Back to FIG. 3, it results from the various possible accesses to the RUs that some of them are not used (310u) because no station with an RU backoff value less than the number of available random RUs has randomly selected one of these random RUs, whereas some other RUs have collided (as example 310c) because at least two of these stations have randomly selected the same random RU. This shows that due to the random determination of random RUs to access, collision may occur over some RUs, while other RUs may remain free.

Once the stations have used the Scheduled and/or Random RUs to transmit data to the AP, the AP responds with a Multi-User acknowledgment (not show in the Figure) to acknowledge the data on each RU.

The MU Uplink (UL) medium access scheme, including both scheduled RUs and random RUs, proves to be very efficient compared to conventional EDCA access scheme, especially in dense environments as envisaged by the 802.11ax standard. This is because the number of collisions generated by simultaneous medium access attempts and the overhead due to the medium access are both reduced.

As a result, the usage of Trigger Frame is naturally extended to cover multiple BSS. The Trigger frame is directed to stations that the AP intends to communicate with at least two different BSSs.

In addition, non-associated stations (that is to say non-AP stations not yet associated to an AP) can use the RU random access procedure in order to be allowed to transmit towards the AP in any randomly allocated resource unit. Aim is to support easy association procedure in dense environments.

As currently designed, the RU random access mechanism (including the RAPS settings and the RU backoff management) is specific to a single BSS, meaning that only the stations belonging to a specific BSS are provided guidance to access the resource units included in the transmission opportunity reserved by the trigger frame emitted for such BSS. For instance, some exemplary issues will be further provided in regards to FIG. 5.

Figure 4A:
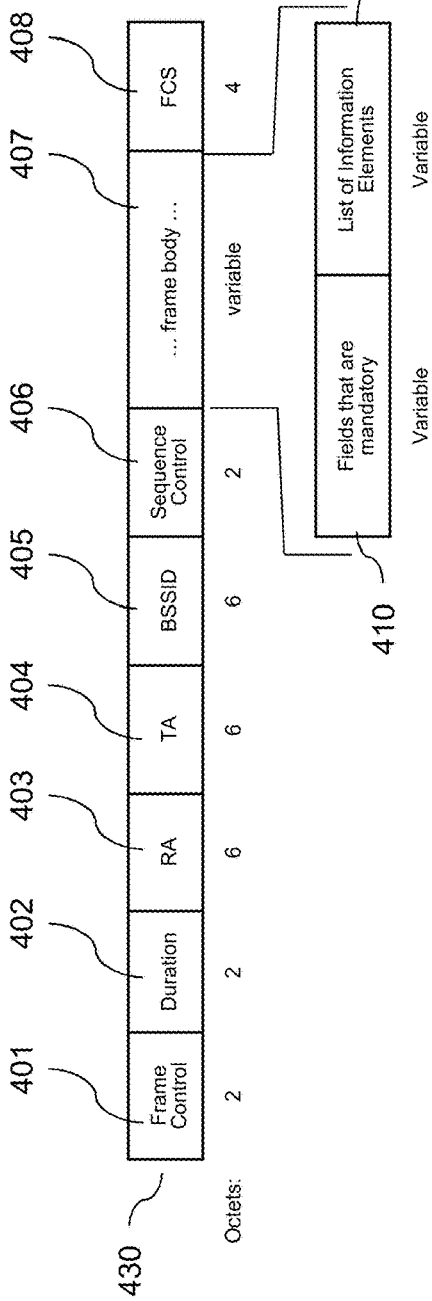
FIGS. 4a, 4b and 4c present the format of a beacon frame according to the 802.11 standard, including the Information Elements representative of the RAPS set and the Multi-BSS configuration.

FIG. 4a represents an example format of a beacon frame usable in a 802.11 type WLAN. The represented format is given for illustrative purposes and other formats may be used. The beacon frame is a management frame used by access points in an infrastructure BSS to communicate throughout the serviced area the characteristics of the connection offered to the BSS members. Information provided in the beacon frame may be used by client stations for joining the network as well as client stations already associated with the BSS. Note that the beacon frame can also be used by stations in an independent BSS (IBSS), i.e. an ad hoc network that contains no access points. As example, some stations may act as a soft-AP (software implemented), that is to say implementing all the functionalities of an IEEE 802.11 Access Point but in an adhoc or transient connection mode typically for a specific purpose (for illustration, for example sharing documents during a meeting or playing multiple-player computer games).

Illustrated beacon frame 430 contains 24 octets of MAC header (fields 401 to 406), 0 to 2312 octets of Frame Body 407, and 4 octets of Frame Check Sequence (FCS) 408. The MAC header includes the following fields: a frame control field 401 (to indicate that the frame is a management frame of beacon subtype), a duration field 402 (set to zero), a RA (Receiver or Destination Address) field 403 (set to broadcast value FF:FF:FF:FF:FF:FF), a TA (Transmitter or Source Address) field 404 and a BSSID field 405. The BSSID field contains the identification (ID) of the BSS, which is the MAC address of the access point servicing the BSS, i.e. identical to the content of the TA field. The Frame Body is a field of variable length and consists of two sets of fields: 1) fields that are mandatory 410, followed by 2) optional fields in the form of Information Elements (IEs) 411.

Mandatory information in field 410 may contain: a Timestamp representing the time at the access point, which is the number of microseconds the AP has been active, and allowing synchronization between non-AP stations in a BSS; Beacon Interval representing the number of time units (TUs) between successive target beacon transmission times (TBTTs); and capability Info to indicate requested or advertised optional capabilities and Supported Rates fields.

All Information Elements in field 411 share a common general format consisting of 1 octet Element ID field, a 1 octet Length field, an optional 1 octet Element ID Extension field, and a variable-length element-specific Information field. Each information element is identified by the contents of the Element ID and, when present, Element ID Extension fields as defined in the 802.11 standard. The Length field specifies the number of octets following the Length field.

It is possible to address stations of a plurality of BSSs with a single beacon frame transmitted by one of the virtual APs of the physical AP, rather than multiple beacon frames transmitted by multiple virtual APs. The virtual AP transmitting the beacon frame (thus having its MAC address in the TA 404 and BSSID 405 fields) is referred to as representative AP or transmitted BSSID. The other virtual APs of the physical AP are referred to as represented APs or non-transmitted BSSIDs, as their addresses do not appear in the TA 404 and BSSID 405 fields of the beacon frame.

A Multiple BSSID information element is defined in the single beacon frame to carry the common, inherited information element values of all of the BSSIDs and the unique information elements of the non-transmitted BSSIDs (represented virtual APs). The BSSIDs of the represented virtual APs can thus be derived from the Multiple BSSID information element.

Figure 4B:
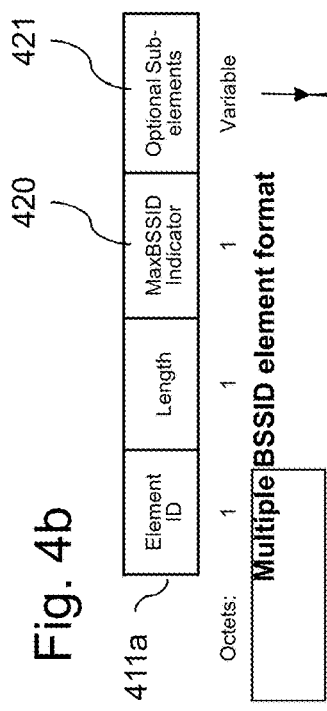

FIG. 4b represents an example format of a Multiple BSSID element.

The multiple BSSID information element, referenced 411a, comprises a 1-byte MAX BSSID indicator field 420 and a variable length Optional Sub-elements field 421.

More than one Multiple BSSID element may be included in a beacon frame. The MAX BSSID Indicator field is 'n', where $2^n$ is the maximum number of BSSIDs supported by the access point, including the transmitted BSSID.

Optional Sub-elements field 421 contains zero or more sub-elements in its Data field, such as for example the "non-transmitted BSSID profile" sub-element.

The "non-transmitted BSSID Profile" is identified by a Sub-element ID of value 0, and shall include the SSID and multiple BSSID-index sub-elements for each of the supported BSSIDs. It may include the Capabilities field followed by a variable number of information elements.

The AP may include two or more Multiple BSSID elements containing elements for a given BSSID index in one beacon frame.

When a station receives a beacon frame with a Multiple BSSID element that consists of a non-transmitted BSSID profile with only the mandatory elements (Capability element, SSID and multiple BSSID-index), it may inherit the complete profile from a previously received beacon frame.

Figure 4C:
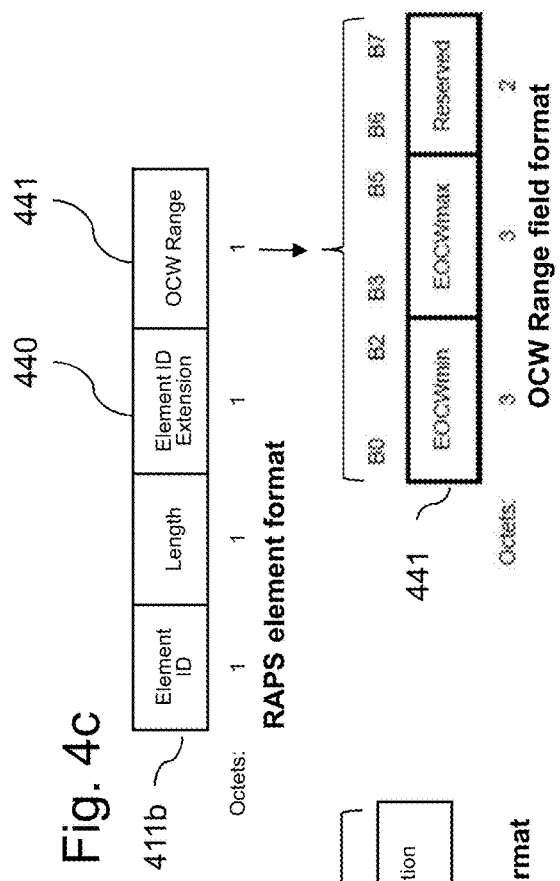

FIG. 4c represents an example format of a RAPS Information Element.

RAPS (OFDMA-based Random Access Parameter Set) element is used by (non-AP) stations to configure their UL MU random access mechanism. The Element_ID, and optionally the Element ID Extension, identify the RAPS format. A typical parameter that may be included in the RAPS information element is the range of OFDMA contention window 441 (OCW Range) for 802.11ax stations willing to initiate random access following reception of a Trigger frame for random access (TF-R). Such a random access trigger frame is a trigger frame having at least one Random access RU, that is to say at least one RU associated with no station (the AID subfield of the User Info field for the RU set to 0). As a result, non-associated STAs can also transmit on such random RU because they have no AID.

The OCW Range field 441 may include subfields EOCWmin and EOCWmax holding parameters to calculate the minimum (OCWmin) and the maximum (OCWmax) values of the OCW (OFDMA contention window), e.g. as follows:

OCWmin=$2^{EOCWmin}-1$; and

OCWmax=$2^{EOCWmax}-1$.

OCWmin represents the minimum value of OCW for the initial UL transmission using UL OFDMA-based random access to be used by a station for initial or successful transmission. OCWmax represents the maximum value of OCW for UL OFDMA-based random access used by a station for its retransmission attempts of UL OFDMA-based random access.

An AP includes the RAPS element in Beacon and Probe Response frames it transmits.

FIG. 5 illustrates an exemplary situation in which embodiments of the invention can be implemented.

For the sake of illustration, the Trigger Frames considered in the following are all Trigger Frames offering at least one random RU.

In the approach of FIG. 5, the wireless network comprising a physical access point 110 and a plurality of stations organized into groups, each group being managed by a virtual access point (e.g. VAP-1 110A and VAP-2 110B as illustrated in FIG. 1) implemented in the physical access point. The AP has emitted a beacon 430 repetitively, containing parameters of each individual BSS group.

The stations contend for an access to the wireless network, and the contention process at each station starts or restarts once the wireless network is detected as idle for a predefined time period (usually DIFS time period after the end of a previous TXOP, for instance after an acknowledgment from the AP or after end of PPDU transmission).

The physical access point thus performs the step of sending a plurality of trigger frames 330-1, 330-2, 330-3 on the wireless network to reserve successive transmission opportunities on at least one communication channel of the wireless network, each transmission opportunity being reserved for a specific group of stations (BSS) and including resource units that form the communication channel and that the stations of the specific group access to transmit data.

Consequently, the physical access point receives, in response to each trigger frame and during the corresponding reserved transmission opportunity, data 310 from one or more stations of the group specific to the trigger frame.

The AP thus performs several TXOP reservations according to the number of BSSs it wants to poll. Each reserved TXOP is independent from one another, in particular because the stations not addressed by the trigger frame set their NAV to the Duration Field specified in the Trigger Frame 330, and thus waits for this duration.

As example, the AP acts as a VAP-1 to emit a first TF 330-1, aiming at triggering stations of BSS-1 group. Secondly, it acts as VAP-2 to emit a TF 330-2, aiming at triggering stations of BSS-2 group. At any moment, the AP may emit a Trigger Frame for multiple BSS groups (TF 330-3), aiming at triggering stations of whole BSS groups managed by the AP. As a result of detecting TF 330-3, a station will contend for access to the random RUs using parameters (RAPS) chosen according to embodiments of the invention.

Random access parameters defined according to embodiments of the invention may also be used by non-associated (i.e. non-registered) stations, i.e. not yet belonging to a specific BSS group, when trying to contend for access to a random RU advertised by the trigger frame. In fact, these non-associated stations may try to access because they are not addressed by the trigger frames and their NAV is not set.

The present invention seeks to provide a more efficient usage of the UL MU random access procedure in case of multiple BSS groups.

The inventors have contemplated considering the multi-BSSID group as a distinct BSS group, in particular regarding the parameters of the UL MU random access procedure. To do so, they propose allowing the AP to disclose a RAPS profile (also referred to as context) for the multiple-BSSID case, to be used by non-AP stations (even the non-associated stations) when triggered for uplink communication by a Trigger Frame addressed to a multi-BSS group.

Various embodiments are proposed below that all relate to a wireless communication methods and related devices.

Figure 11A:
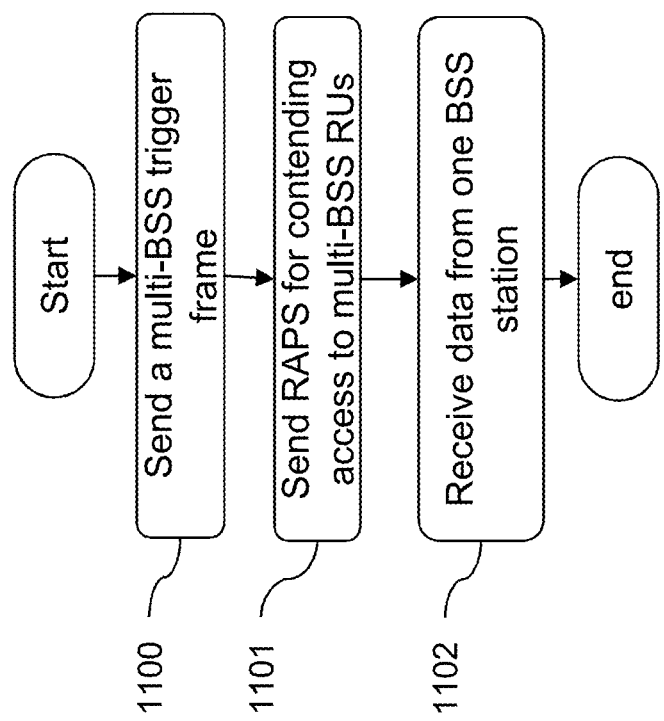
FIGS. 11a and 11b present first general embodiments of the invention implemented, respectively, at a physical access point and at a station belonging to a first group of stations.

FIG. 11a presents first general embodiments of the invention implemented at a physical access point.

At step 1100, a trigger frame is sent by the AP for reserving a transmission opportunity on at least one communication channel of the wireless network. The transmission opportunity including random resource units that the stations may access using a contention scheme. The trigger frame identifying a plurality of groups (referred to as multi-BSS trigger frame), stations of which are allowed to contend for access to the random resources units included in the transmission opportunity to transmit data.

At step 1101, AP sends a joint set of random access parameters (RAPS) to be used in common by stations of the plurality of groups identified in the trigger frame to contend for access to a random resource unit included in the transmission opportunity. The joint set of parameters may be transmitted by the physical AP according to different variants, among which: transmission in a beacon frame either as a dedicated information element (Multiple BSSID element) or a RAPS element containing the parameters for the transmitted BSSID.

At step 1102, and in response to the trigger frame, receiving, over the random resource unit, data from a station of one of the plurality of identified groups identified in the trigger frame.

Figure 11B:
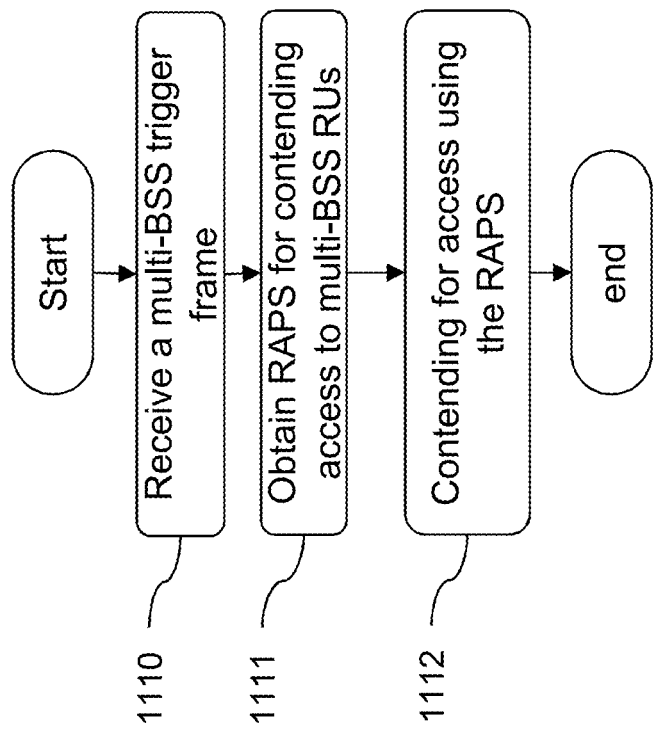

FIG. 11b presents first general embodiments of the invention implemented at a station belonging to a first group of stations.

At step 1110, a trigger frame is received from the physical access point. The trigger frame reserving a transmission opportunity on at least one communication channel of the wireless network, the transmission opportunity including random resource units that the stations may access using a contention scheme. The trigger frame is of type multi-BSS identifying the first group and a second group, stations of which are allowed to contend for access to the random resources units included in the transmission opportunity to transmit data.

At step 1111, a joint set of random access parameters is obtained to be used in common by stations of the first and second groups to contend for access to a random resource unit included in the transmission opportunity. Different variants may be envisaged for obtaining the joint set of random access parameters, among which:

the joint set of random access parameters is obtained from the received trigger frame.

the joint set of random access parameters is obtained from a beacon frame, separate from the trigger frame, received from the physical access point.

At step 1112, the station contends for access to the random resource unit using the obtained joint set of random access parameters.

Figure 6:
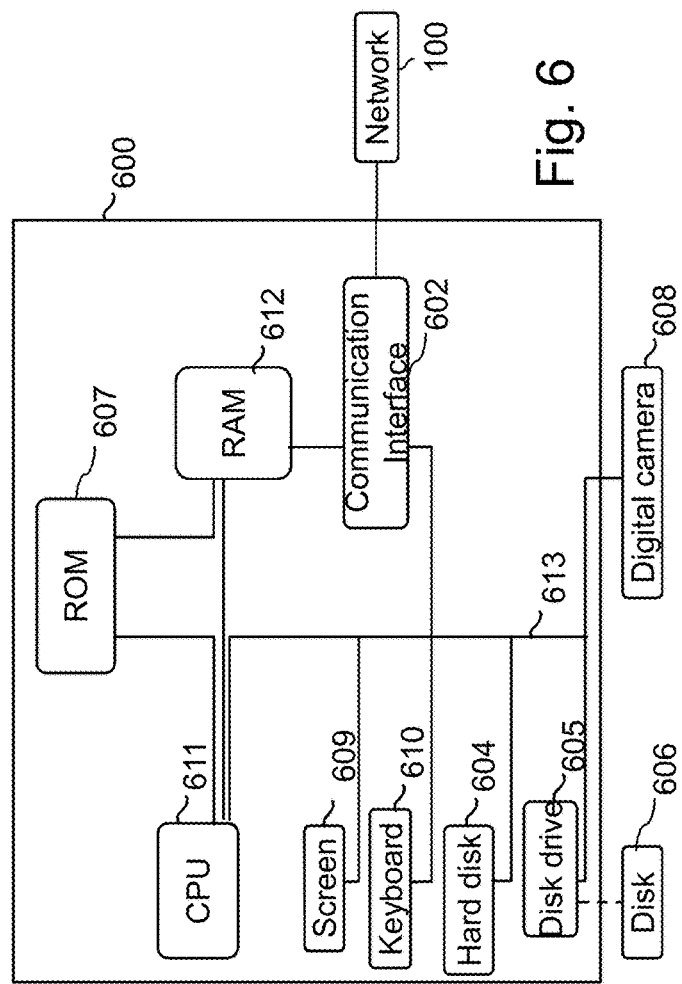
FIG. 6 shows a schematic representation a communication device in accordance with embodiments of the present invention.

FIG. 6 schematically illustrates a communication device 600, either a non-AP station 101-107 or the access point 110, of the radio network 100, configured to implement at least one embodiment of the present invention. The communication device 600 may preferably be a device such as a micro-computer, a workstation or a light portable device. The communication device 600 comprises a communication bus 613 to which there are preferably connected:

a central processing unit 611, such as a microprocessor, denoted CPU;

a read only memory 607, denoted ROM, for storing computer programs for implementing the invention;

a random access memory 612, denoted RAM, for storing the executable code of methods according to embodiments of the invention as well as the registers adapted to record variables and parameters necessary for implementing methods according to embodiments of the invention; and at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

a data storage means 604 such as a hard disk, for storing computer programs for implementing methods according to one or more embodiments of the invention;

a disk drive 605 for a disk 606, the disk drive being adapted to read data from the disk 606 or to write data onto said disk;

a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
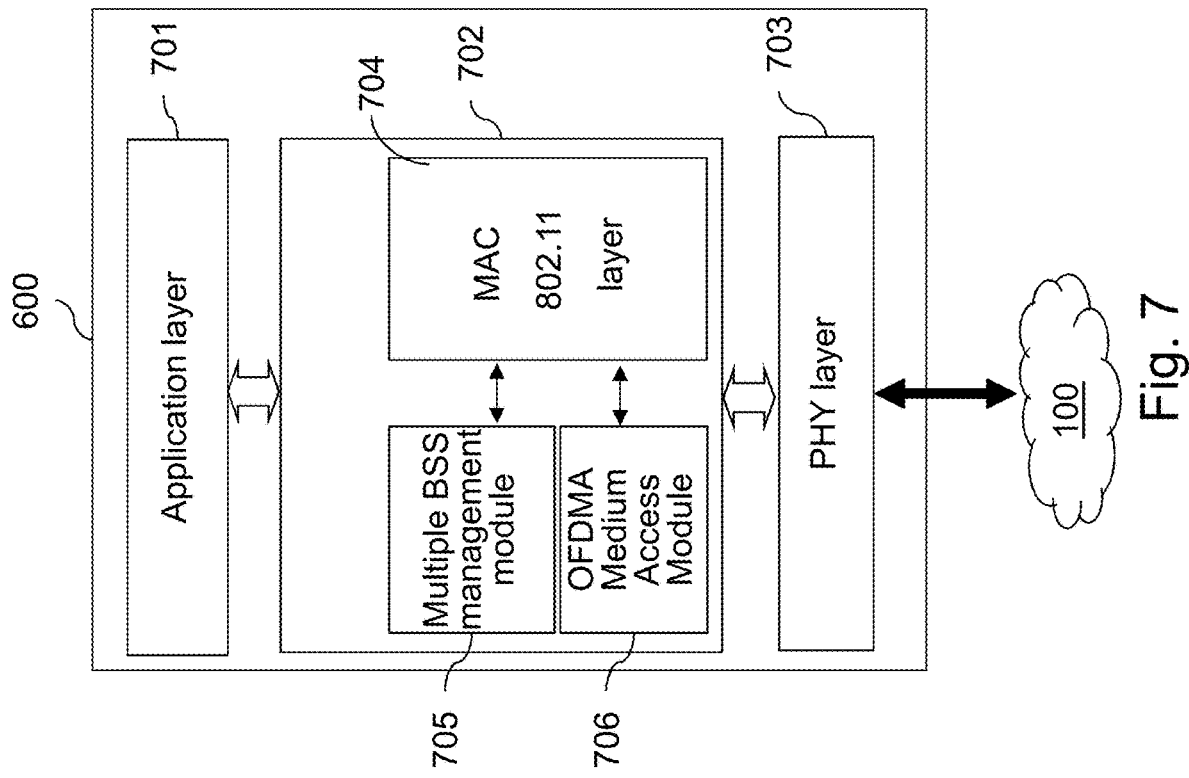
FIG. 7 shows a schematic representation of a wireless communication device in accordance with embodiments of the present invention.

FIG. 7 is a block diagram schematically illustrating the architecture of the communication device 600, either the AP 110 or one of stations 101-107, adapted to carry out, at least partially, the invention. As illustrated, device 600 comprises a physical (PHY) layer block 703, a MAC layer block 702, and an application layer block 701.

The PHY layer block 703 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 330 (FIG. 3) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and additional blocks 705 and 706 for carrying out, at least partially, the invention. The MAC layer block 702 may optionally be implemented in software, which software is loaded into RAM 612 and executed by CPU 611.

Preferably, the additional block 705, referred to as multiple BSS management module for controlling access to random OFDMA resource units (sub-channels) in case of multiple BSSs, implements the part of embodiments of the invention that regards non-AP station and/or AP operations of device 600.

For instance and not exhaustively, the operations for the AP may include generating and sending beacon frames as defined below, i.e. beacon frames identifying a plurality of groups, instead of a single BSS, including a specific group referencing several BSSs (multiple-BSS group) forming the whole network cell, and then managing the RAPS profile for random access of resource units during the reserved TXOP to such multiple-BSS group; the operations for a station different from the AP may include analyzing received beacon frames to determine if the station is allowed to access some resource units in the context the trigger frames allow several BSSs to communicate during the reserved TXOP.

Preferably, the additional block 706, referred as to OFDMA Medium Access module for configuring and updating the OFDMA-based UL MU random access procedure, implements the part of embodiments of the invention that regards non-AP station operations of device 600.

MAC 802.11 layer 704, multiple BSS management module 705 and OFDMA Medium Access module 706 interact one with the other in order to process accurately communications over multiple BSS groups according to embodiments of the invention.

On top of the Figure, application layer block 701 runs an application that generates and receives data packets, for example data packets of a video stream. Application layer block 701 represents all the stack layers above MAC layer according to ISO standardization.

Embodiments of the present invention are now illustrated using various exemplary embodiments in the context of IEEE 802.11ax by considering OFDMA sub-channels and multiple BSS groups. Although the proposed examples use the trigger frame 330 (see FIG. 3) sent by an AP for a multi-user uplink transmissions, equivalent mechanisms can be used in a centralized or in an adhoc environment (i.e. without an AP).

Although the present invention is also described with reference to beacon frame embodiments, the present invention is not limited to beacon frame modification but also any 802.11 management frame such as the probe response frames.

Also the invention is not limited to the 802.11ax context. Below, the term legacy refers to non-802.11ax stations, meaning 802.11 stations of previous technologies that do not support OFDMA communications.

FIG. 8 illustrates an exemplary transmission block of a communication non-AP station 600 according to embodiments of the invention.

As mentioned above, the station includes a EDCA channel access module and possibly an OFDMA access module 706, both implemented in the MAC layer block 702. The EDCA channel access module includes:

- a plurality of traffic queues 810 for serving data traffic at different priorities; Usually, four Access Categories (ACs) are the following in decreasing priority order: voice (or "AC_VO"), video (or "AC_VI"), best effort (or "AC_BE") and background (or "AC_BG").
- a plurality of queue backoff engines 811, each associated with a respective traffic queue for using a set of EDCA parameters, in particular to compute a respective queue backoff value, to be used by an associated backoff counter to contend for access to at least one communication channel in order to transmit data stored in the respective traffic queue.
- Since the traffic queues or ACs operate concurrently in accessing the wireless medium, it may happen that two traffic queues of the same communication station have their backoff ending simultaneously. In such a situation, a virtual collision handler (812) of the MAC controller operates a selection of the AC having the highest priority between the conflicting ACs, and gives up transmission of data frames from the ACs having lower priorities.

Service differentiation between the ACs is achieved by setting different queue backoff parameters between the ACs, such as different $CW_{min}$, $CW_{max}$, AIFSN and/or different transmission opportunity duration limits (TXOP_Limit). This contributes to adjusting QoS. This is the EDCA access scheme.

The OFDMA access module includes an OBO backoff engine 800 separate from the queue backoff engines, for using RU contention parameters, in particular to compute an RU backoff value, to be used by an RU backoff counter to contend for access to the OFDMA random resource units defined in a received TF (sent by the AP for instance), in order to transmit data stored in either traffic queue in an OFDMA RU. The OBO backoff engine 800 is associated with a transmission module, referred to as OFDMA muxer 801. For example OFDMA muxer 801 is in charge, when the RU backoff value described below reaches zero, of selecting data to be sent from the AC queues 810.

The conventional AC queue back-off registers 811 drive the medium access request along EDCA protocol (channel contention access scheme), while in parallel, the OBO backoff engine 800 drives the medium access request onto OFDMA multi-user protocol (MU UL contention access scheme).

As these two contention access schemes coexist, the non-AP station implements a medium access mechanism with collision avoidance based on a computation of backoff values:

- a queue backoff counter value corresponding to a number of time-slots the station waits (in addition to an AIFS period), after the communication medium has been detected to be idle, before accessing the medium. This is EDCA;
- an RU backoff counter value corresponding to a number of idle random RUs the station detects, after a TXOP has been granted to the AP or any other station over a composite channel formed of RUs, before accessing the medium.

The multiple BSS management module 705 aims at storing RAPS profiles for at least two BSS groups, and supports the configuration of OBO backoff engine 800 for controlling access to random OFDMA resource units (sub-channels) for a given BSS group. This procedure will be further detailed according description of FIG. 10.

Figure 9B:
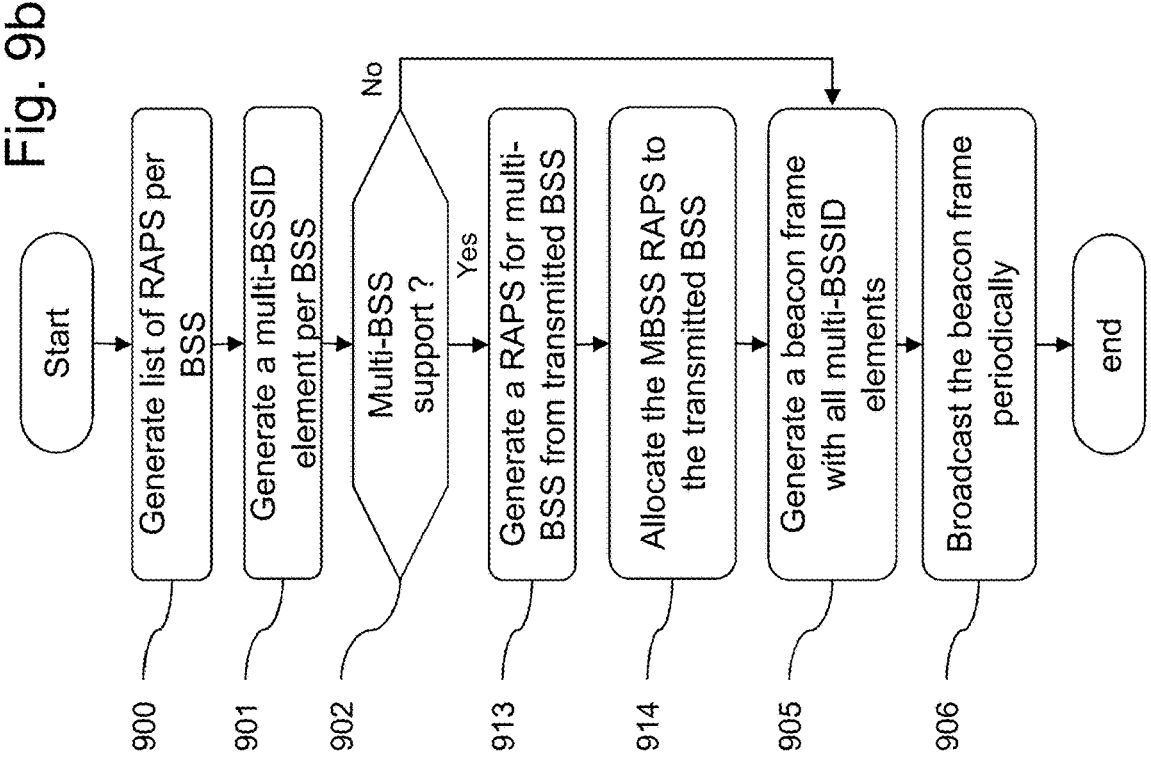
FIGS. 9a and 9b illustrate, using a flowchart, general steps of AP emitting a beacon frame for multiple BSS, according to embodiments of the invention.
Figure 9A:
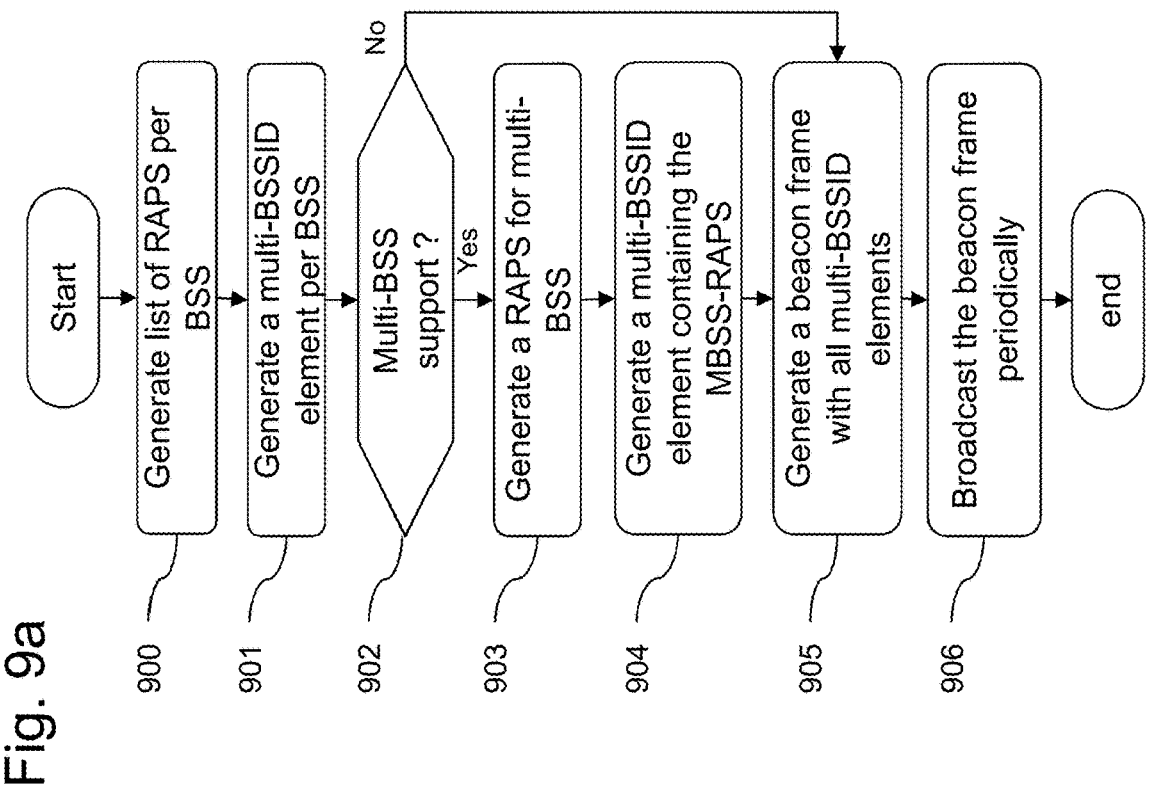

FIGS. 9a and 9b illustrates, through flowcharts, two embodiments in which the AP provides RAPS profiles for non-AP stations of various BSSs. Similar steps have same references.

These methods are typically implemented in an access point of the invention.

Initially, a list of RAPS profiles (each for a given BSS) is generated in addition to classical (e.g. security) profiles and SSIDs to be advertised (step 900).

The profiles of transmitted BSSID group are provided in list of IE 411 of the beacon frame body 407. The profiles of at least one non-transmitted BSSID group are provided through Multiple BSSID elements 411a to be appended later in list 411 of the beacon frame body 407.

In case of only one BSS is supported by the AP ("No" to test 902), the algorithm continues to step 905 comprising formatting the beacon frame and later periodically emitting that beacon frame (step 906).

If multi-BSS support is required ("yes" to test 902), a dedicated RAPS profile corresponding to the plurality of groups of stations is added to the Beacon Frame (steps 903 and 904).

This dedicated RAPS profile or element (further identified as MBSS-RAPS) aims to be used by any station for contending access during a TXOP reserved for a plurality of groups of stations (e.g. by means of Trigger Frame 330-3 of FIG. 4) to upload data to AP.

The OCW Range (441) for the MBSS-RAPS may be adapted to the whole cell; for example by averaging various EOCWmin and EOCWmax values used for the different BSS groups. The AP may use any proprietary or internal consideration for determining these values, as for example the density of stations, measured contention or network load encountered in each individual BSS it manages.

Preferably, the MBSS-RAPS (which format is compliant with 411b) is directly provided as an Information Element in the list 411: for that purpose, values of Element_ID and Element_ID Extension fields are used to guarantee that the MBSS-RAPS element be distinct from RAPS elements already defined for individual BSSs.

Alternatively, the MBSS-RAPS is defined through a distinct Multiple BSSID element 411a, identifying that the concerned BSS is a multiple BSS. This new multiple BSSID information element would comprise the same MAX BSSID indicator value, but the MBSS-RAPS is conveyed inside a newly defined Non-Transmitted BSSID Profile corresponding to all (or at least several) BSSs. This Non-Transmitted BSSID Profile for MBSS-RAPS transmission can be identified by a Sub-element ID of value distinct from 0.

As a result, the AP has managed transmission to the non-AP stations of an additional RAPS profile, called the MBSS-RAPS profile, dedicated to the multi-BSS Trigger Frame case.

Alternative method of FIG. 9b consists in a distinct manner to provide the MBSS-RAPS profile compared to the previous method of FIG. 9a.

In order to limit the number of RAPS elements provided into the beacon frame, the basic profile of the transmitted BSSID, i.e. of the representative AP, is selected as MBSS-RAPS profile, i.e. joint profile for the BSSs (step 914). That is to say the RAPS profile to be used by non-AP stations will be the RAPS profile of the transmitted BSSID, that is the BSS identified by BSSID field 405. As a result, the RAPS profile (embedding the MBSS-RAPS values) is located in the list 411, before any Multiple BSSID element 411a of non-transmitted BSSIDs. Access to this profile requires less processing and is quicker.

Optionally, the computation of values forming the OCW Range may be different from previous scheme as the parameters are identical for Trigger Frames received in a single transmitted BSS and multi-BSS contexts (step 913).

The approach of FIG. 9b saves bandwidth space in management frames such as the beacon frames.

Thus, a rule is proposed as a variant for associated stations: when a station is associated with a BSS with a non-transmitted BSSID, the station selects the RAPS from the transmitted BSSID Beacon frame for responding to any further reception of a multiple BSS Trigger frame. As a result, associated stations manage at most two RAPS contexts (for their own BSS, and for the multi-BSS context represented by the transmitted BSSID).

This has also a great advantage for non-associated stations: when a station is not yet associated to a BSS, it has only to store and use the RAPS from the transmitted BSSID Beacon frame when it receives a multiple BSS Trigger frame.

Alternative method of FIG. 9b provides further advantages of using the RAPS profile from the transmitted BSSID as a default profile: consequently, low-end AP devices may, by simplicity, only consider this profile for Trigger Frames issued both from their non-transmitted BSSID contexts (with condition that no specific RAPS is provided in their non-transmitted BSSID) and for their multi-BSS context. Those AP devices are considered as low-end devices because they are limited in their RAPS capabilities to adapt per BSS to changing conditions (like number of registered stations, contention, etc.).

Finally, the Beacon Frame is modified by the AP to identify a plurality of RAPS profiles allowed to be used for performing uplink OFDMA transmission in random RUs.

Any non-AP station that wants to know which RAPS profile it can access thus has to:

1) read, within the received beacon frame, a plurality of per-BSS RAPS parameter sections 411b additional to legacy information elements (inside 421); this includes transmitted and non-transmitted BSSID groups;

2) for at least one per-BSS parameter section 420 defining a BSSID:

- determine, based on one BSSID field included in the per-BSS parameter section (405 or inside 411a), whether it is willing to join this BSS group, store, based on the BSSID, the RAPS profile (along with current OBO and OCW value if any) inside its module 705.

Next, as further described by FIG. 10, in case the station is authorized to access the one or more determined random resource units for a received Trigger Frame, it accesses at least one of the determining RAPS profile to initiate the random access procedure applicable to the reserved transmission opportunity.

FIG. 10 illustrates, using a flowchart, general steps of a method according to embodiments of the invention at one station 600 different from the AP. This embodiment can operate with at least either embodiment of FIG. 9a or embodiment of FIG. 9b at the AP side.

At step 1000, station 600 receives a Trigger frame from an Access Point.

If the receiving station belongs to a BSS (or virtual BSS) of the transmitting AP, the Trigger Frame is not filtered by the PHY layer as defined in the standard. The filtering is made on so-called "colors" defined in the 802.11ax standard, which mandates that the BSS colors of all the multiple BSSs managed by a single AP are the same.

At step 1001, station 600 analyzes the received trigger frame at the MAC layer. In particular, TA and RA fields are analyzed.

It checks whether the received TF defines a multiple BSS scheme, with which it is registered (or willing to register with).

It consists in checking whether one of TA or RA defines a plurality of BSSs, e.g. a set of BSSIDs, or not, i.e. if it includes BASE_BSSID or any other multi-BSS address like the transmitted BSSID.

If no multiple BSS scheme is used or the multi-BSS address does not encompass the specific BSSID of station 600 (e.g. does not match BASE_BSSID to which station 600 is registered), step 1006 is implemented by the station consisting in loading from storage of module 705 the conventional RAPS profile associated with the BSSID that the station 600 is associated with.

Otherwise, step 1002 is performed to load the multi-BSS profile (MBSS-RAPS).

Alternatively to test 1001, a non-associated station may use the MBSS-RAPS element for any of the received Trigger Frame(s) belonging to the same physical AP: that is to say any TF (as example 330-1/330-2 according to FIG. 5) issued from a VAP will not conduct to run step 1006, but in contrary to run the step 1002. This approach has the advantage of only storing one single RAPS (which is the MBSS-RAPS) by non-associated stations. With regards to embodiment of FIG. 9b, this single MBSS-RAPS is conveyed through transmitted BSSID. Until the station is associated, step 1002 is executed.

It is to be noted that if the correct context is already used, step 1002 has no action to perform.

Then step 1003 is executed within the determined (selected) RAPS context.

As noted above, the random RUs can be determined using for instance the AID associated with each RU defined in the TF (AID=0 may mean random RU). So the number of random Resource Units supporting the random OFDMA contention scheme ($Nb_{RU}$) is known at this stage. Obtaining the number of random RUs may be advantageously performed if the number of random RUs varies from one TF to the other.

Next, station 600 will decrement the RU backoff value OBO based on the number $Nb_{RU}$ of random resource units defined in the received trigger frame: OBO=OBO−$Nb_{RU}$.

This is because station 600 is determined as being an eligible station to transmit data in an OFDMA random RU, if its pending RU backoff value OBO is not greater than the number of OFDMA random RUs. This condition makes the OBO considered as expired.

In case of no eligibility, the process ends.

Otherwise, step 1004 is executed to determine the RU the station can access through contention. It is a RU randomly selected from the available random RUs ($Nb_{RU}$) of the received TF.

Next to step 1004, step 1005 is performed during which station 600 accesses the RUs determined at step 1004 and transmits its trigger-based PPDU in uplink direction to the AP.

As commonly known, the destination station (the AP) will send an acknowledgment related to each received MPDU from multiple users inside the OFDMA TXOP, so that the station 600 may update its OCW contention value accordingly.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising an access point and a plurality of stations organized into a plurality of basic service sets, BSSs, the method comprising the following steps, at the access point:
sending a management frame including random access parameters to be used by stations of the plurality of BSSs to contend for access to one or more random resource units splitting a communication channel in a frequency domain;
sending a trigger frame reserving a transmission opportunity on at least one communication channel of the wireless network, the transmission opportunity including random resource units that stations may access using a contention scheme configured by the random access parameters included in the management frame; and
in response to the trigger frame, receiving, over a random resource unit included in the reserved transmission opportunity, data from a station of one of the plurality of BSSs,
wherein the random access parameters include a lower boundary $OCW_{min}$ and/or higher boundary $OCW_{max}$, both defining a selection range from which a size of a contention window OCW for random access is selected, and
wherein the lower boundary $OCW_{min}$ and/or higher boundary $OCW_{max}$ is for use by stations of a first BSS and by stations of a second BSS.

2. The method of claim 1, wherein the management frame is a beacon frame, separate from the trigger frame, sent by the access point.

3. The method of claim 2, wherein a plurality of sets of random access parameters are sent by the access point in one or more beacon frames, each set being associated with one BSS for use by the stations of that BSS to contend for access to random resource units of a transmission opportunity reserved by a trigger frame for the stations of the BSS.

4. The method of claim 3, wherein a plurality of sets of random access parameters are sent by the access point in one beacon frame.

5. The method of claim 3, wherein the random access parameters form a joint set that is one of the plurality of sets of random access parameters.

6. The method of claim 5, wherein at least one beacon frame includes an indication indicating which one of the plurality of sets is to be used as the joint set of random access parameters.

7. The method of claim 5, wherein the joint set of random access parameters is the set of random access parameters of the BSS identified as the transmitter of the beacon frame.

8. The method of claim 1, wherein the sent trigger frame includes a list of BSSIDs identifying the plurality of BSSs, stations of which are allowed to contend for access to the random resources units of the transmission opportunity reserved by the trigger frame.

9. The method of claim 8, wherein each BSSID is derived from a base BSSID specific to the access point.

10. The method of claim 9, wherein the BSSID field is n-bit long, where n is the number of bits varying between the BSSIDs compared to the base BSSID.

11. A wireless communication method in a wireless network comprising an access point and a plurality of stations organized into a plurality of basic service sets, BSSs, the method comprising the following steps, at one station belonging to a first BSS:
receiving a management frame including random access parameters to be used by stations of the first BSS and a second BSS to contend for access to a-random resource units splitting a communication channel in the frequency domain;
receiving a trigger frame from the access point, the trigger frame reserving a transmission opportunity on at least one communication channel of the wireless network, the transmission opportunity including random resource units that stations may access using a contention scheme; and
contending for access to a random resource unit, included in the reserved transmission opportunity, using received random access parameters,
wherein the random access parameters include a lower boundary $OCW_{min}$ and/or higher boundary $OCW_{max}$, both defining a selection range from which a size of a contention window OCW for random access is selected, and
wherein the lower boundary $OCW_{min}$ and/or higher boundary $OCW_{max}$ is for use by stations of a first BSS and by stations of the second BSS.

12. The method of claim 11, wherein the contention scheme at the station decrements a backoff value OBO of a backoff counter initially drawn in the range, zero to OCW, of the contention window for random access, and triggers access to a random resource unit in the transmission opportunity upon the backoff value reaching a target value.

13. The method of claim 11, wherein the management frame is a beacon frame, separate from the trigger frame, received from the access point.

14. The method of claim 13, wherein a plurality of sets of random access parameters are received from the access point in one or more beacon frames, each set being associated with one BSS for use by the stations of that BSS to contend for access to random resources units of a transmission opportunity reserved by a trigger frame for the stations of the BSS.

15. The method of claim 14, wherein the random access parameters form a joint set that is one of the plurality of sets of random access parameters.

16. The method of claim 15, wherein at least one beacon frame includes an indication indicating which one of the plurality of sets is to be used as the joint set of random access parameters.

17. The method of claim 16, wherein the joint set of random access parameters is the set of random access parameters of the BSS identified as the transmitter of the beacon frame.

18. The method of claim 15, wherein each BSS is uniquely identified by a BSS identification, BSSID, derived from a base BSSID specific to the access point.

19. The method of claim 18, wherein the set associated with the BSS identified by the base BSSID is selected as the joint set of random access parameters.

20. The method of claim 15, wherein the joint set of random access parameters is selected among the plurality of sets based on a predefined rule known to stations of the first and the second BSS.

21. An access point in a wireless network comprising a plurality of stations organized into a plurality of basic service sets, BSSs, the access point comprising:
at least one microprocessor configured for carrying out the following steps:
sending a management frame including random access parameters to be used by stations of the plurality of BSSs to contend for access to random resource units splitting a communication channel in the frequency domain;
sending a trigger frame reserving a transmission opportunity on at least one communication channel of the wireless network, the transmission opportunity including random resource units that stations may access using a contention scheme configured by random access parameters included in the management frame; and
in response to the trigger frame, receiving, over a random resource unit included in the reserved transmission opportunity, data from a station of one of the plurality of BSSs,
wherein the random access parameters include a lower boundary $OCW_{min}$ and/or higher boundary $OCW_{max}$, both defining a selection range from which a size of a contention window OCW for random access is selected, and
wherein the lower boundary $OCW_{min}$ and/or higher boundary $OCW_{max}$ is for use by stations of a first BSS and by stations of a second BSS.

22. A station device in a wireless network comprising an access point and a plurality of stations organized into a plurality of basic service sets, BSSs, the station, belonging to a first BSS, comprising:
at least one microprocessor configured for carrying out the following steps:
receiving a management frame including random access parameters to be used by stations of the first BSS and a second BSS to contend for access to random resource unit units splitting a communication channel in the frequency domain;

receiving a trigger frame from the access point, the trigger frame reserving a transmission opportunity on at least one communication channel of the wireless network, the transmission opportunity including random resource units that stations may access using a contention scheme; and contending for access to a random resource unit, included in the reserved transmission opportunity, using received random access parameters, wherein the random access parameters include a lower boundary $OCW_{min}$ and/or higher boundary $OCW_{max}$, both defining a selection range from which a size of a contention window OCW for random access is selected, and wherein the lower boundary $OCW_{min}$ and/or higher boundary $OCW_{max}$ is for use by stations of a first BSS and by stations of the second BSS.

* * * * *